CONVERTER DEVICES

Filed Dec. 27, 1960

2 Sheets-Sheet 1

INVENTOR.
WILLIAM J. FRANK
BY Hudson, Boughton, Williams, David & Hoffmann
ATTORNEYS INVENTOR.
WILLIAM J. FRANK
BY Hudson, Boughton,
Williams, David & Hoffmann
ATTORNEYS 3,217,314
CONVERTER DEVICES William J. Frank, Chagrin Falls, Ohio, assignor to The Warner & Swasey Company, Cleveland, Ohio, a corporation of Ohio Filed Dec. 27, 1960, Ser. No. 78,571
3 Claims. (Cl. 340—347)

This invention relates to converter devices and particularly to a device for converting analogue quantities to a digital quantity.

Analogue to digital converters are widely employed to provide a digital output in the form of a plurality of signals which are indicative of an analogue quantity which, for example, may comprise the angular position of a rotatable shaft such as a lead screw in a machine tool. To effect the conversion it has been the practice to provide an information member conventionally in the form of a rotatable wheel or disk having a zone or track including alternate opaque and transparent areas. The disk is mounted for rotation in accordance with rotation of the shaft relative to zone reading means which provides a digital output indicative of the angular position of the shaft.

In one well known arrangement an encoder disk is inscribed with a code in binary form and includes a plurality of concentric zones of different radii each of which zones represents a separate digit in the code. The transparent and opaque portions of each zone represent the two different values of the digit which is represented by the associated zone. The code is read by reading means responsive to radiant energy which passes through the transparent portions from a suitable source of radiant energy during rotation of the code disk. The reading means provide a plurality of binary valued signals which constitute a multidigit number indicative of the angular position of the shaft.

In another arrangement a digitizer disk has been employed which includes a single zone having alternate transparent and opaque portions rotatable relative to reading means which produces a train of pulses, one for each unit of rotation of the disk.

The reading means is generally in the form of photocells which are responsive to light from a light source and which produce output signals having magnitudes dependent upon the amount of light applied thereto. In an encoder the photocells are ordinarily arranged in a reading line parallel to a radius of the disk such that a separate cell is associated with each digit zone. As the code disk rotates relative to the cells, the combinations of the digit values at the reading line change and the outputs produced by the cells along the reading line are changed accordingly so that the angular position of the shaft is continuously indicated. In the digitizer a single cell is associated with the single zone.

In order to effect an accurate conversion it is necessary that the reading operations be performed in an accurate and unambiguous manner. Errors in reading may occur when the dividing line between a transparent portion and an opaque portion of a zone is passing by the associated photocell and the cell is being changed to a light or dark condition. Since the cell has a finite extent in the direction of disk rotation, a finite angular rotation of the disk is necessary to completely change the cell from light to dark or vice versa for producing the required variation of the output from the cell between its two extreme values during a transition period. Also, when the disk is rotating slowly, or is vibrated or oscillated, the output of the cell may actually stop at a value between its two extremes during a transition period. Perfect reading definition would be obtained if the amount of light applied to the cell changed instantaneously during a transition period so that the output of the cell also underwent an instantaneous change. In practice, however, it is impossible to obtain an instantaneous change in the amount of light applied to a photocell during a transition period.

According to the present invention an analogue to digital converter device is provided including a novel arrangement for minimizing the possibility of errors and ambiguities in the reading of information inscribed on an information member. In the present invention the output of a reading unit for a zone is applied to a novel and improved circuit which produces an output quantity which is switched between two stable states substantially instantaneously when the quantity applied thereto attains predetermined different values during its variations. The circuit may be termed a decision element and is in the form of a regenerative amplifier including a pair of electroresponsive valve devices preferably comprising transistors designated input and output transistors. The transistors are operatively connected to each other, and a feedback circuit is connected between the collector of the output transistor and the base of the input transistor. The output of the circuit has a generally rectangular waveform.

The invention is applicable to a converter having any type of reading unit which produces an output variable between two extreme values during a finite angular movement of the information member. For example, the reading unit may comprise a single photocell with or without an amplifier. In the preferred embodiment, however, the reading unit for a zone includes a pair of radiant energy responsive devices in the form of photocells arranged as described in U.S. application S.N. 78,567 filed concurrently herewith by Ralph H. Schuman and assigned to the assignee of the present invention.

As described in such application two cells of a zone are spaced by a distance so that the amounts of light applied thereto change in opposite directions substantially simultaneously during rotation of the disk. The currents resulting from the two cells are applied to a current responsive translating device which produces an output quantity having a first level when one of the cells receives more light than the other cell and having a second level when the other cell receives more light than the one cell. The change between the first and second levels is initiated when the cells have substantially equal amounts of light applied thereto. The resulting output from the translating device is dependent on the difference in currents of the two cells and in the present invention such output is applied to the input transistor of the current responsive bistable decision element.

It is therefore an object of the present invention to provide an analogue to digital converter including an information member movable relative to information reading means in accordance with movement of a device, the analogue quantity of which is to be converted, with improved means for increasing the accuracy and definition of the reading operation.

It is another object of the invention to provide a device as defined in the preceding object wherein the information member includes a zone having a plurality of alternate transparent and opaque portions with reading means in association with the zone including radiant energy responsive means and circuit means responsive to the output from the reading means for producing an output quantity which is switched between two stable states substantially instantaneously at preselected values of the output of the reading means during transitions between transparent and opaque portions.

It is a still further object of the invention to provide an analogue to digital converter including a disk rotatable relative to reading means in accordance with movement of a member, the analogue of which is to be converted, the disk including a circular zone having a plurality of alternate transparent and opaque portions with current responsive circuit means responsive to the output of the reading means for producing an output of generally rectangular waveform which is switched between two stable states substantially instantaneously at preselected different values of the output of the reading means during transitions between transparent and opaque portions.

It is still another object of the invention to provide a device as defined in the preceding object wherein the reading means comprises two photocells spaced such that the amounts of light applied thereto change in opposite directions simultaneously during rotation of the disk, and a translating device connected to the cells to produce an output having a first level when the amount of light applied to one of the cells is greater than the amount of light applied to the other cell and having a second level when the amount of light applied to the other cell exceeds that applied to the one cell.

It is still another object of the invention to provide an improved bistable circuit for producing from an input quantity which varies between two extreme values in a finite interval of time an output quantity which is switched between two stable states substantially instantaneously when the input quantity increases and decreases to preselected different values between said extreme values.

Other objects of the invention will become apparent from the following description taken in conjunction with the accompanying drawings in which similar reference characters designate corresponding parts and in which FIG. 1 is a plan view of an information member such as a code disk employed in the present invention;

Figure 4:
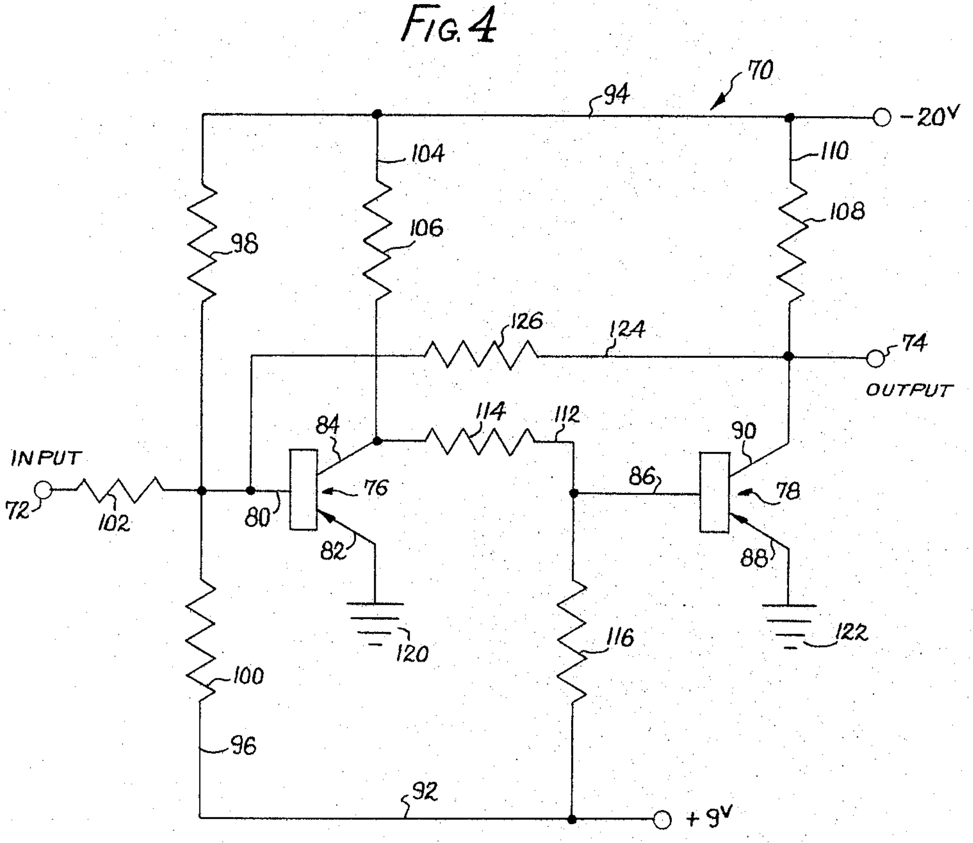
FIG. 4 is a schematic diagram of the blocked circuit of FIG. 3.
Figure 5A:
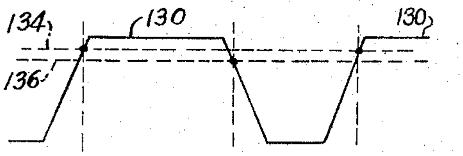
Figure 5B:
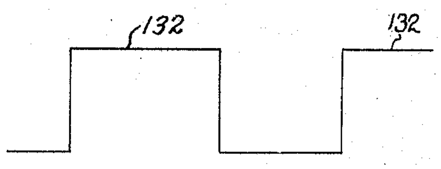

FIGS. *5a* and *5b* are graphical representations respectively showing curves representing input and output quantities of the circuit of FIG. 4.

While the present invention is susceptible of various modifications and constructions, it is employed with particular advantage in the conversion of an analogue quantity to a digital quantity wherein a wheel or disk is rotated relative to light responsive reading means in accordance with rotation of a shaft, the analogue of which is to be converted. As an example, the present invention may be employed to continuously indicate in digital form the angular position of a rotatable shaft, such as the lead screw in a machine tool.

Figure 2:
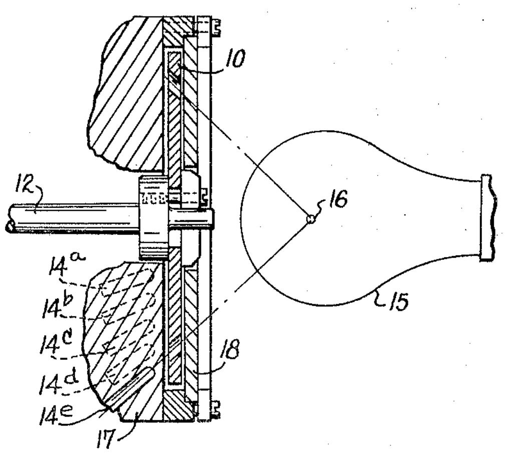
FIG. 2 is a view in side elevation with parts shown in section and with parts broken away showing the disk of FIG. 1 operatively positioned with respect to a plurality of photocells and a light source.

Referring now to the drawings, there is illustrated in FIG. 2 a portion of a converter device embodying the teachings of the present invention which is arranged to convert an analogue quantity to a digital quantity. The converter device includes an information member 10 which in the described and illustrated embodiment is in the form of a code bearing encoder disk attached to a shaft 12 for rotation with the shaft. The shaft 12 may be operatively connected to a device (not shown) the analogue of which is to be converted. For example, the shaft 12 may be rotated in accordance with, or may itself comprise, a lead screw of a machine tool the angular position of which is to be continuously represented in digital form.

The disk 10 is rotatable relative to a plurality of radiant energy responsive code reading devices shown in the form of photocells of any conventional type. In FIG. 2 five photocells are illustrated and these cells are designated respectively by the reference characters 14*a*–14*e*. The photocells are arranged in a reading line to receive light from a suitable source of radiant energy shown in the form of an incandescent lamp 15 having a filament 16 and which is positioned on the side of the disk 10 opposite to the side containing the photocells 14*a*–14*e*. The cells are mounted within a plurality of bores formed in a frame 17 such that the cells radiate from the filament 16 to extend in the direction of light rays emanating from the filament. As is understood in the art, each cell produces an output current which has a magnitude dependent upon the amount of light applied thereto. The disk 10 is rotatable with respect to a mask 18 positioned between the disk and the light source 15 and having transparent defining slits opposite the cells in each reading unit and between the cells and the filament. The defining slits are shown in FIG. 1 and are designated by the reference characters $S^1$ and $S^2$.

Figure 1:
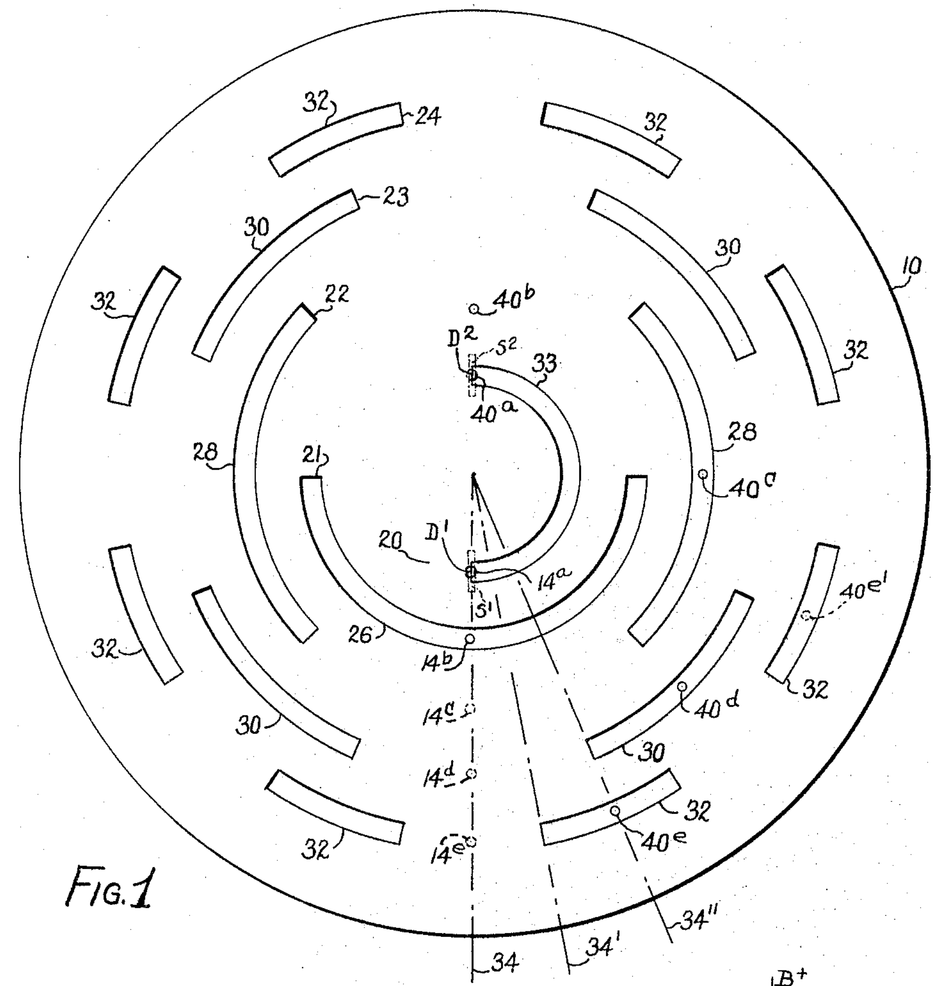

The code disk 10 is illustrated in plan in FIG. 1 and as there shown includes a plurality of concentric zones 20, 21, 22, 23 and 24 having different radii. The zones 20–24 represent digits of a code inscribed in binary form on the disk and when a natural binary code is employed, the significance of the digits decreases outwardly from the center of the disk. In the illustrated embodiment the inscribed code employed is the Gray code or reflected binary code but it is understood that the invention is applicable to the reading of other codes. The reflected binary code is described in U.S. Patent No. 2,632,058.

Each of the zones 20–24 includes a plurality of divisions shown as comprising transparent and opaque portions disposed in alternation along the associated zone. The transparent and opaque portions may be provided in any suitable manner. As an example, the disk 10 may comprise an opaque glass plate having transparent sections which constitute the transparent portions. In the illustrated embodiment, however, the transparent portions are in the form of slits and the opaque portions constitute the material of the disk between the slits. Photographic-etching techniques are also applicable to the forming of the transparent portions.

It is noted with reference to FIG. 1 that the transparent and opaque portions in each zone are of equal length and that the number of such portions in a particular zone is one-half the number of the portions in the adjacent zone of greater radius. An exception to this is the number of transparent and opaque portions in the coarsest zone 20 which is equal to the number of portions in zone 21. As an example, the zone 21 includes a single transparent portion 26 and a single opaque portion. The next zone 22 displaced outwardly from the zone 21 includes a pair of transparent portions 28, the zone 23 includes four transparent portions 30, and the finest zone 24 includes eight transparent portions 32. The coarsest zone 20 has a single transparent portion 33 and it is observed that the transparent portions 26 and 33 extend through angles of one hundred and eighty degrees and are spaced angularly relative to each other by ninety degrees.

In order to read a code inscribed on a code disk, such as the disk 10, it is conventional practice to provide a fixed reading line extending parallel to a radius of the code disk. As an example, a reading line represented by the broken line 34 is shown in FIG. 1 and this line contains the photocells 14*a*–14*e* which are represented by circles and which are positioned along the line 34 such that a separate photocell is associated with each of the zones 20–24. The number indicated by the outputs of the cells changes each time the disk rotates through a certain angular distance which is the distance between broken lines 34′ and 34″. The lines 34′ and 34″ are shown spaced by an angle of the order of eleven degrees, and accordingly, with the five digit code shown there are thirty-two changes of digit combinations for one revolution of the disk. This means that the encoder can discriminate thirty-two quantum steps or angular positions.

The transparent and opaque portions in each zone represent respectively two different values of the digit which is represented by the associated zone. For example, the transparent portion 26 may represent a value 0 and the associated opaque portion may represent a value 1 of the digit represented by the zone 21. The disk 10 is shown as having a five digit reflected binary code inscribed thereon but it is understood that codes in binary form having any desired number of digit places may be utilized.

As the disk 10 rotates relative to the photocells 14*a*–14*e*, the light applied to the photocells will be periodically blocked by passage of the opaque portions between the filament 16 and the photocells. At any given time the combination of output signals produced by the photocells in the reading line constitutes a digital representation of the angular position of the disk 10 and consequently of the angular position of the shaft connected to the disk.

When the disk 10 is moved with respect to the photocells, transition periods occur during which the dividing lines between opaque portions and associated transparent portions are passing by the associated photocells. Readings taken during such transition periods may be inaccurate due to the varying signals produced by the photocells resulting from changes in the amounts of light applied thereto during transitions. When the disk is moving slowly, or is oscillating back and forth, the output of the cell may actually stop at a value between its two extreme values during a transition period.

In the aforementioned Schuman application a system is described wherein the chance of errors in a code reading operation is materially reduced by the provision of a pair of photocells in association with a zone with the cells being spaced by a distance such that the amounts of light applied thereto change in opposing directions substantially simultaneously during a transition period. This arrangement is shown in FIG. 1 wherein additional photocells represented by circles 40*a*–40*e* are associated respectively with the cells 14*a*–14*e* to provide a separate pair of cells for each digit zone. The photocells of each pair constitute a digit reading unit for the associated zone and are shown spaced by a distance which is substantially equal to the length of a division or a value indicating portion of the associated digit zone.

In the above mentioned Schuman application each pair of photocells is connected to a separate translating device such as a transistor amplifier, which produces an output voltage dependent upon the difference between the cell currents and which begins to change between upper and lower levels when the amounts of light applied to the associated pair of photocells are substantially equal. This condition is realized at the center of a transition period when the division lines D1 and D2 between transparent and opaque portions are directly opposite the associated cells. The arrangement is such that when one of the cells receives more light than the other the output voltage of the transistor is decreased from its upper level to its lower level, and when the other cell receives more light than the light received by the one cell, the output voltage of the transistor is increased from its lower level to its upper level. The two levels of the transistor output voltage represent respectively the two different values of the digit which is represented by a particular zone.

The decision element of the present invention is employed with particular advantage with the reading arrangement set forth in the Schuman application, but it is understood that the invention is not limited to such reading arrangement, and is applicable to other reading arrangements such as the conventional single photocell reader. Also, the decision element has other applications as will be apparent to those skilled in the art.

Figure 3:
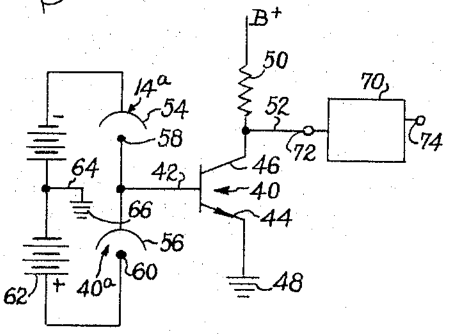
FIG. 3 is a schematic diagram showing a circuit associated with a zone of the code disk of FIG. 1 including a pair of photocells, a translating device connected to the cells and a decision element in block form connected to the translating device.

Referring now to FIG. 3, there is schematically shown a circuit associated with a zone and including a pair of photocells, a transistor 40 connected to the cells and a decision element represented by the block 70 responsive to the output of the transistor 40. The circuit of FIG. 3 will be described in association with the zone 20 and a plurality of such circuits are employed each with a separate one of the zones.

The photocells 14*a* and 40*a* associated with the zone 20 are connected to the transistor 40 which is shown in the form of an NPN transistor having a base electrode 42, an emitter electrode 44 and a collector electrode 46. The emitter 44 is connected to ground as at 48 and the collector 46 is connected to a source of positive potential designated by the reference character B+ through a resistor 50. An output conductor 52 is connected between the collector 46 and the lower terminal of the resistor 50.

The cells 14*a* and 40*a* include respectively cathodes 54 and 56 and anodes 58 and 60. The base electrode 42 of the transistor 40 is connected to the anode 58 of the cell 14*a* and to the cathode 56 of the cell 40*a*. The cathode 54 of the cell 14*a* and the anode 60 of the cell 40*a* are connected respectively to negative and positive terminals of a source of direct voltage shown in the form of a battery 62 having a center tap connection 64 connected to ground as at 66.

When the amounts of light applied to the cells 14*a* and 40*a* are substantially equal, which indicates that the division lines D1 and D2 between the transparent portion 33 and the adjacent opaque portion in the zone 20 are directly opposite the cells 14*a* and 40*a*, substantially zero current flows between the base 42 and the emitter 44 so that the transistor 40 is nonconducting, which gives rise to an output voltage on the conductor 52 having substantially the B+ value. When the amount of light applied to the cell 14*a* is greater than that applied to the other cell 40*a*, the same condition prevails and the current between the base 42 and the emitter 44 is zero and the transistor 40 is nonconducting. The value of the voltage on the conductor 52 is therefore at the B+ value to thereby indicate a particular value of the digit being read which value will be assumed to be 1. The transistor 40 is a current responsive device, and its emitter-collector current is dependent upon its base-emitter current. The foregoing condition occurs when the division lines D1 and D2 between the transparent portion 33 and the associated opaque portion have just passed by the cells 14*a* and 40*a* respectively as the disk 10 is rotated in a clockwise direction as viewed in FIG. 1.

When the cell 40*a* receives more light than the cell 14*a*, current flows between the base and emitter of the transistor 40 which renders the transistor 40 conductive. Accordingly, the output voltage appearing on the conductor 52 is reduced from its upper B+ level to its lower level which will be assumed to indicate a value 0 of the digit. The latter condition occurs when the division lines D2 and D1 have just passed the cells 14*a* and 40*a* respectively during continued clockwise rotation of the disk 10.

It is thus seen that the output voltage on the conductor 52 has a magnitude dependent upon which of the cells 14*a* and 40*a* has applied thereto a greater amount of light and this magnitude is indicative of the value of a digit represented by the zone 20 associated with the cells 14*a* and 40*a*. The above described arrangement materially minimizes errors in the reading of a zone as described in the aforementioned Schuman application. However, the waveform of the output voltage includes sloped portions wherein the output voltage is increasing and decreasing during transition periods. As a result, if the disk is rotating slowly or is oscillated, the voltage on conductor 52 may at times stop at a value intermediate its two extreme values which could result in an erroneous reading.

According to the preferred embodiment of the invention the output voltage appearing on the conductor 52, which voltage varies between two extreme values during a finite movement of the disk, is applied to the decision element represented by the block 70 in FIG. 3 and shown in detail in FIG. 4. The decision element 70 operates to produce an output quantity which is switched between two stable states substantially instantaneously during transition periods when the input quantity attains predetermined different values between its two extreme values. Preferably, the predetermined values of the input voltage at which the output quantity is switched are selected to be as close as possible to the upper B+ value of the input voltage so as to minimize nonsymmetry in the waveform of the output quantity. In the described embodiment, when voltage on the conductor 52 is increasing, the predetermined value thereof which switches the output of the decision element is greater than the predetermined value thereof which switches the output when voltage on the conductor 52 is decreasing. The output quantity from the decision element has a rectangular wave pattern which is generated in response to rotation of the disk.

The decision element 70 is shown in FIG. 4 and includes an input terminal 72 to which is applied the voltage on the conductor 52 of FIG. 3. The decision element also includes an output terminal 74 at which appears the output voltage resulting from operation thereof. The decision element includes a pair of electroresponsive valve devices 76 and 78 which are operatively connected to perform as a regenerative amplifier and which are preferably in the form of transistors shown as being of the PNP type although transistors of the NPN type may also be used. The transistor 76 includes a base electrode 80, an emitter electrode 82 and a collector electrode 84. In a similar manner the transistor 78 includes a base electrode 86, an emitter electrode 88 and a collector electrode 90.

Electrical potentials are supplied to the circuit by a pair of conductors 92 and 94 connected respectively to positive and negative potentials. For example, the conductor 92 may have applied thereto a potential of +9 volts and the conductor 94 may have applied thereto a potential of −20 volts. A conductor 96 is connected between the conductors 92 and 94 and includes a pair of resistors 98 and 100. The input terminal 72 is connected to the conductor 96 between the resistors 98 and 100 through a resistor 102. The base electrode 80 of the transistor 76 is also connected to the conductor 96 between the resistors 98 and 100.

A conductor 104 is connected to the conductor 94 and includes a resistor 106, the lower end of which is connected to the collector electrode 84 of the transistor 76. The collector 90 of the transistor 78 is connected to the lower terminal of a resistor 108 included in a conductor 110 connected to the conductor 94. The base electrode 86 of the transistor 78 is connected to a conductor 112 including a resistor 114, the left-hand end of which is connected to the collector 84 of the transistor 76. A resistor 116 is included in the conductor 112 and is connected between the base electrode 86 and the conductor 92. Emitter electrodes 82 and 88 are connected respectively to ground, as indicated at 120 and 122.

A feedback circuit is connected between the transistors 76 and 78 so that current from the output transistor 78 is fed back to the base electrode 80 of the input transistor 76. For this purpose a conductor 124 is connected between collector 90 of the transistor 78 and the base 80 of the transistor 76 and includes a resistor 126. The feedback circuit provides a regenerative action such that the conductive conditions of the transistors are rapidly switched during operation of the circuit.

Operation of the decision element 70 will be described with reference to FIGS. *5a* and *5b*, which are graphical representations showing curves 130 and 132 which indicate respectively variations of the input and output voltages of the decision element 70 with respect to disk rotation. As stated hereinbefore, the voltage at the conductor 52 of FIG. 3 constitutes the input voltage to the decision element 70 and is applied to the terminal 72. The curve 130 representing the input voltage is observed to vary between two extreme values and a finite angular movement of the disk is required for such variation. The curve 130 also is nonsymmetrical due to the nature of the circuit of FIG. 3. The decision element 70 operates to produce an output voltage represented by the curve 132 which has a substantially rectangular wave pattern and which is switched between two stable values substantially instantaneously each time the input voltage increases to a certain value and decreases to a certain different value during transition periods.

The value of the input voltage at which the output voltage is switched from its minimum value to its maximum value is represented by the point at which the upwardly sloping portion of the curve 130 is intersected by the broken horizontal line 134, and the value of the input voltage at which the output voltage is switched from its maximum value to its minimum value is represented by the point at which the downwardly sloping portion of the curve 130 is intersected by the broken horizontal line 136 shown in FIG. *5a*. The output voltage 132 is switched at the same point during each transition period, and as will presently appear, the values of the input voltage which cause the switching may be varied. As set forth in the Schuman application, such values of the input voltage are preferably selected to occur when a division line $D^1$ or $D^2$ is within an angular distance of the center line of a mask slit $S^1$ or $S^2$ which is one-eighth the angular extent of the mask slit. The nonsymmetry of the decision element output voltage resulting from such arrangement is tolerable in many applications.

The circuit 70 is arranged and the circuit components selected such that when the input voltage applied to the terminal 72 is at its minimum value, the base electrode 80 is at a negative potential with respect to the emitter electrode 82 and the transistor 76 is in a conductive condition. As a result, the collector electrode 84 of transistor 76 and the base electrode 86 of transistor 78 are at their most positive potentials so that the transistor 78 is in a nonconductive condition. At this time the output terminal 74 is at its most negative potential and the output voltage is at its minimum value which may represent a value 0 of the digit. This situation occurs when the cell *40a* is light and the cell *14a* is dark and the transistor 40 is conducting.

When the input voltage begins to increase from its minimum value during a transition period, the base 80 becomes more positive and when the value of the input voltage is that indicated by the broken line 134, or some other selected value between the two extreme values, the base 80 becomes positive with respect to the emitter 82, whereby the conduction of the transistor 76 begins to decrease. As a result, the collector 84 and the base 86 become more negative and when the base 86 becomes negative relative to the emitter 88, the transistor 78 begins to conduct.

When the transistor 78 begins to conduct, current flows from the emitter 88 to the collector 90 and through the feedback circuit including the conductor 124 and the resistor 126 to the base electrode 80, whereupon the base 80 is rendered still more positive to further decrease conduction of transistor 76. When this occurs the base 86 is rendered still more negative and conduction of transistor 78 is further increased. This action continues until the transistor 76 is completely cut off and the transistor 78 is fully conductive. The above described cumulative action occurs very rapidly so that the voltage at the output terminal 74 is increased from its minimum value to its maximum value almost instantaneously and remains at such value until the input voltage falls to a value indicated by the broken line 136. This value of the output voltage may represent a value 1 of the digit being read.

The circuit 70 is designed such that when the input voltage is decreased to the value indicated by the broken line 136, or some other selected value, during a transition period, the reverse action takes place in that the base 80 is rendered sufficiently negative that the transistor 76 begins to conduct, whereupon the potential of the base 86 becomes sufficiently positive that conduction of the transistor 78 is decreased. When this occurs current through the feedback circuit is also decreased so that the base 80 assumes a still greater negative potential whereupon conduction of transistor 76 is further increased. This action is cumulative until the transistor 76 is fully conductive and the transistor 78 is completely cut off and the circuit 70 is restored to its initial condition. The cut off action of transistor 78 also takes place substantially instantaneously and the voltage at the output terminal 74 is very rapidly reduced from its maximum value to its minimum value. The described cycle of operation of the circuit 70 is repeated as the disk 10 rotates.

The increasing value of the input voltage represented by the line 134 is produced just before the division lines D1 and D2 arrive at positions directly opposite the center lines of the slits S1 and S2 as the disk 10 rotates in a clockwise direction as viewed in FIG. 1. At such time the cell 40*a* is going dark but is receiving slightly more light than the cell 14*a* which is going light. The division lines are at this time spaced from the center lines of the mask slits by distances less than one-eighth the angular extent of a mask slit. The decreasing value of the input voltage indicated by line 136 is produced just after the division lines D2 and D1 have passed by the center lines of the slits S1 and S2 respectively during continued clockwise rotation of the disk, and are spaced from such center lines by a distance equal to one-eighth the angular extent of a mask slit. At this time the cell 40*a* is going light and is receiving more light than the cell 14*a* which is going dark. The difference between the two input voltage values at which the output voltage represented by curve 132 is switched may be varied over a considerable range by changing the values of the resistors 102 and 126. The transition time of the output voltage between its two stable extreme values may be made negligible by connecting capacitors across the resistors 114 and 126.

It is thus seen that the decision element 70 produces an output voltage which has two stable values representative respectively of the two values of a digit which is represented by a zone of the disk 10. The output voltage has at all times one or the other of these values depending upon the value of the input voltage. The possibility of errors in reading is minimized inasmuch as the output voltage is instantly switched between its two stable values during a transition period, and is always at one or the other of such values. The output voltage at the terminal 74 may be applied to a suitable utilization device (not shown).

The present invention, although described in connection with the conversion of an analogue quantity to a number in binary form, is applicable to a digitizer which produces an output pulse for each unit of rotation of the disk. For example, the zone 24 alone may be utilized, and a single cell, or two cells as described herein, associated with the decision element may be employed to produce the voltage 132, and each transfer of such voltage is an indication of a unit of rotation of the shaft. Although the decision element is shown with the terminal 72 connected to the transistor 40, the transistor 40 may be omitted, and the terminal 72 may be connected to the anode 58 of cell 14*a* and to the cathode 56 of cell 40*a*. Since the decision element is a current responsive device, its output will be switched in dependence upon the difference between currents from the cells 14*a* and 40*a* when connected directly to the cells in the same manner as when connected to transistor 40.

Although the invention has been described with reference to certain specific embodiments thereof, numerous modifications are possible and it is desired to cover all modifications falling within the scope of the appended claims.

Having described my invention, I claim:

1. In a device for indicating the position of a movable member, a code member movable with said movable member and having a zone thereon including alternate first and second portions which respectively transmit and prevent the transmission of a radiant energy, a source of radiant energy continuously applying radiation to said zone, reading means responsive to radiation transmitted by the radiation transmitting portions of said zone for producing an output signal having one magnitude when receiving maximum radiation from said zone and a second level when receiving substantially no radiation from said zone, said zone alternately causing said radiation to be transmitted to and blocked from said reading means on movement of said code member with said movable member and said output signal requiring a finite movement of the code member at the junction line between adjacent ones of said first and second portions to vary said output signal between its two extreme magnitudes corresponding respectively to maximum radiation and substantially no radiation from said zone, and current responsive circuit means responsive to said output signal produced by said reading means and switched between two states substantially instantaneously in response to said output signal being increased and decreased to a corresponding one of first and second preselected magnitudes between said extreme magnitudes as the code member is moved to provide a square wave output, said circuit means comprising a first transistor having an input circuit to which said output signal is applied and an output circuit, said first transistor being nonconductive at one of said extreme magnitudes for said output signal and being rendered conductive as said output signal moves to said first preselected magnitude, a second transistor having an input circuit and an output circuit, means connecting the output circuit of said first transistor to the input circuit of said second transistor to control said second transistor to produce said square wave output at the output circuit for said second transistor when said first transistor becomes conductive and nonconductive, and regenerative circuit means connecting the output circuit of said second transistor to the input of said first transistor to cause said first transistor to switch rapidly when said output signal reaches the corresponding one of said first preselected magnitudes and said second preselected magnitude as said output signal is increasing and decreasing between its extremes.

2. A device as defined in claim 1 wherein the said first transistor has a base electrode and said second transistor has a collector-emitter output circuit and said regenerative circuit means comprises a resistance circuit connected to said base circuit and said collector-emitter circuit in a regenerative arrangement.

3. In a device for indicating the position of a movable member, a code member movable with said movable member and having a plurality of zones thereon each including alternate first and second portions which respectively transmit and prevent the transmission of a radiant energy, a source of radiant energy continuously applying radiation to said zones, reading means responsive to radiation transmitted by the radiation transmitting portions of each of said zones for producing an output signal having one magnitude when receiving maximum radiation from said zone and a second level when receiving substantially no radiation from said zone, the zones alternately causing said radiation to be transmitted to and blocked from the corresponding reading means on movement of said code member with said movable member and said output signal from each reading means requiring a finite movement of the code member at the junction line between adjacent ones of said first and second portions to vary said output signal between its two extreme magnitudes corresponding respectively to maximum radiation and substantially no radiation from the corresponding zone, and current responsive circuit means responsive to said output signal produced by the reading means and switched between two states substantially instantaneously in response to said output signal being increased and decreased to first and second preselected magnitudes between said extreme magnitudes as the code member is moved, each of said circuit means comprising a first transistor having an input circuit to which said output signal is applied and an output circuit, said first transistor being nonconductive at one of said extreme magnitudes for said output signal and being rendered conductive as said output signal moves to said first preselected magnitude, a second transistor having an input circuit and an output circuit, means connecting the output circuit of said first transistor to the input circuit of said second transistor to switch said second transistor between states to provide a square wave output, and regenerative circuit means connecting the output circuit of said second transistor to the input of said first transistor to cause said first transistor to switch rapidly to its conductive state when said output signal reaches said first preselected magnitude and to become nonconductive when it reaches said second preselected magnitude.

References Cited by the Examiner

UNITED STATES PATENTS

| | | | |
|---|---|---|---|
| 2,685,082 | 7/54 | Beman et al. | 340—347 |
| 2,775,727 | 12/56 | Kernahan et al. | 340—347 |
| 2,793,807 | 5/57 | Yaeger | 340—347 |

MALCOLM A. MORRISON, *Primary Examiner.*

STEPHEN W. CAPELLI, *Examiner.*